United States Patent [19]

Taskier

[11] 4,359,510
[45] * Nov. 16, 1982

[54] HYDROPHILIC POLYMER COATED MICROPOROUS MEMBRANES CAPABLE OF USE AS A BATTERY SEPARATOR

[75] Inventor: Henry T. Taskier, Fanwood, N.J.

[73] Assignee: Celanese Corporation, New York, N.Y.

[ * ] Notice: The portion of the term of this patent subsequent to Nov. 3, 1998, has been disclaimed.

[21] Appl. No.: 174,146

[22] Filed: Jul. 31, 1980

[51] Int. Cl.$^3$ ............................................. H01M 2/14
[52] U.S. Cl. ................................. 429/144; 429/206; 429/248; 429/250; 429/252
[58] Field of Search .................................. 429/143–145, 429/248, 250, 254, 206, 216, 247; 204/295; 427/173, 250; 428/290, 296, 301

[56] References Cited

U.S. PATENT DOCUMENTS

| | | | |
|---|---|---|---|
| 3,472,700 | 10/1969 | Kollman et al. | 429/250 |
| 4,192,908 | 3/1980 | Himy et al. | 429/53 |
| 4,192,988 | 3/1980 | Himy . | |
| 4,217,404 | 8/1980 | Verzwyvelt | 429/250 X |

OTHER PUBLICATIONS

"High Cycle Life, High Rate Nickel–Zinc Battery Report No. 2" for ERADCOM by Otto Wagner.
"High Cycle Life, High Energy Density Nickel–Zinc Battery Report No. 3" by Otto Wagner.
"High Rate Stable Nickel–Cadmium Batteries" (DELET-TR-75-1770-F) by J. Hill (Aug. 1979).

Primary Examiner—Anthony Skapars
Attorney, Agent, or Firm—Robert J. Blanke

[57] ABSTRACT

The present invention is directed to microporous membranes having a surfactant impregnated therein which is coated on at least one surface thereof with a polymer coating, such as cellulose acetate. The polymer coating possesses functional groups in the presence of an aqueous alkaline environment which permits it to undergo hydrogen bonding with water and to transport battery electrolyte through the coating by diffusion. The presence of the coating on the normally hydrophobic substrate membrane, when used in conjunction with a suitable surfactant, increases the wettability of the substrate membrane and thereby lowers its electrical resistance. The coating also serves to immobilize various soluble electrode derived ions at the coating-electrolyte interface thereby hindering their penetration into the pores of the substrate microporous membrane. Consequently, the plugging of the pores of the substrate membrane by these ions is substantially reduced thereby increasing the life of a battery in which said coated membranes are used as the battery separators.

13 Claims, No Drawings

HYDROPHILIC POLYMER COATED MICROPOROUS MEMBRANES CAPABLE OF USE AS A BATTERY SEPARATOR

BACKGROUND OF THE INVENTION

The present invention relates to coated microporous membranes which exhibit improved wettability and can be used in alkaline storage batteries and particularly in batteries having electrode systems containing zinc and silver electrodes, e.g., nickel-zinc and silver-zinc, and a process for making the same.

Recent developments in the area of open celled microporous polymeric films, exemplified by U.S. Pat. Nos. 3,839,516; 3,801,404; 3,679,538; 3,558,764; and 3,426,754, have instigated studies to discover applications which could exploit the unique properties of these new films. Such films which are in effect a gas-breathing water barrier can be used as vents, gas-liquid transfer mediums, battery separators and a variety of other uses.

One disadvantage of these films, which in the past has limited the number of applications to which they may be put, has been their hydrophobic nature. This is especially true when polyolefinic films, a preferred type of polymeric material often employed in the manufacture of microporous films, are employed. Because these films are not "wetted" with water and aqueous solutions they could not be used advantageously in such logical applications as filter media electrochemical separator components and the like.

Several proposals have been put forth in the past to overcome these problems such as exemplified by U.S. Pat. No. 3,853,601; and Canadian Pat. No. 981,991, which utilize a variety of hydrophilic surfactant impregnants. Such surfactant impregnants while imparting hydrophilicity to the microporous film do not maximize the properties of said films when employed as battery separators.

More specifically, a battery separator is a critical component of a battery. A battery is comprised of one or more electrolytic cells enclosed by a housing. Each cell includes two electrical terminals or electrodes, the anode and the cathode. The electrodes are immersed in a conducting medium, the electrolyte. Electrical current flows between the electrodes. This electrical current results from the flow of electrons across a circuit external to the electrolyte. Just as electrons, flow across the external circuit so do ions, i.e., charged species, flow in the electrolyte. Although it is absolutely essential to the production of an electrical current that ions flow between electrodes in the electrolyte, it is usually detrimental in a battery for ionic species derived from a respective electrode to flow to the electrode of opposite charge with respect to said ionic species. This interferes with the efficiency of the battery. To prevent deleterious ionic flow of one or more ionic species between terminals is a function of a battery separator. More specifically, a battery separator is disposed in the electrolytic cell between the anode and cathode of the electrolyte to prevent or retard deleterious ion migration.

The above description suggests the type of material that should ideally be used as a battery separator. An excellent battery separator is one which has pore openings which are small enough to prevent large ionic species, such as large electrode derived ions to flow through its pores yet large enough to permit the flow of electrolyte derived ions such as K+ and OH− through these pores to reach the electrode of opposite charge in relation thereto. Similarly, the battery separator should be of minimum thickness in view of the well known fact that the flow of ions across a battery separator is inversely proportional to the thickness of the separator.

Another requirement of a battery separator suggests itself when one considers that the electrolytes employed in most battery applications are highly basic or acidic. A good battery separator should be inert, to these highly corrosive materials.

Still another requirement for a good battery separator is that the separator be rapidly wetted by the electrolyte employed. In view of the fact that essentially all of the electrolytes currently utilized are aqueous solutions, this requirement necessitates that the battery separator be hydrophilic. The battery separator must be totally and rapidly wetted so as to provide a continuous ionic path on either side of the battery separator to permit the flow of certain ions therethrough. An analogy can be drawn to an electrically conducting wire. A break in the wire cuts off the flow of electrons. So, in the case of an electrolyte, the non-wetting of a portion of a battery separator effectively cuts off the path for ionic flow over the non-wetted area, thus, cutting down on the output of the battery.

Seemingly, the aforedescribed requirements, if satisfied, should be enough to produce a satisfactory battery separator. Unfortunately, in addition to the above-described criteria for battery separators, additional properties should also be possessed by the same depending on the type of electrode system employed therein. For example, while a nickel-zinc battery has one of the best initial energy-to-weight and power-to-weight characteristics of known batteries, the same exhibits poor cycle life, i.e., the number of charge and discharge cycles which a battery can undergo before it no longer is capable of performing its intended function.

The poor cycle life of nickel-zinc batteries is especially troublesome for a variety of reasons. This problem is associated with any secondary battery which employs zinc as the anode and an alkaline electrolyte, because of the high solubility of the oxidation products thereof, namely, ZnO or $Zn(OH)_2$.

The short cycle life of batteries employing zinc anodes is attributed to premature cell failures which can be characterized as being catastrophic or gradual. Catastrophic cell failures are believed to be due to internal shorting of the cell by the growth of zinc dendrites which form a bridge between the electrodes.

For example, the nickel-zinc battery is based on the following half-cell reactions:

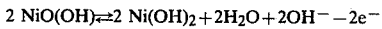

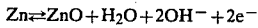

The reversible reactions are written so that the discharge cycle reads from left to right. The zinc half-cell reaction as written above, however, is an oversimplification since the oxidized form of zinc exists as a mixture of ZnO, $Zn(OH)_2$ and $Zn(OH)_4^=$. The zincate ion ($Zn(OH)_4^=$) is soluble and contributes to the complexity of cell performance.

When a battery employing a zinc anode is charged, the above-described reaction reverses and zinc is formed. Ideally, the zinc which is formed is redeposited on the zinc anode. However, some of the zinc which is produced in a charging sequence characterized by a high current density gives rise to formation of zinc dendrites which tend to bridge out from the zinc anode and connect up with the cathode. Even when a battery separator is inserted between the electrodes the zinc dendrites can actually penetrate the separator over a number of charging cycles leading to catastrophic cell failure.

The gradual, but unacceptable rapid loss of cell energy capacity occurs more frequently with repeated deep discharge cycling wherein the active mass of zinc anode is almost completely depleted. This gradual loss of energy capacity is related to pore plugging, other deterioration in the separator, and to shape change in the zinc electrode. Pore plugging is caused by the precipitation of various soluble zincate ions (e.g., $Zn(OH)_4^=$) which are formed during discharge but which become insoluble when the load is removed from the battery. If the soluble zincate ions are within the pores when precipitation occurs, the pores become plugged thereby reducing the efficiency of the separator.

The shape change of the electrode results from the fact that the zinc is not redeposited during charging at the location where it has been oxidized during discharging but is redeposited and concentrated instead in that part of the cell where the current density is greatest. This uneven redepositing of the zinc ions causes densification of the electrode and reduces its effective surface area. The uneven buildup of the zinc causes the electrode to swell in thickness.

The harmful effects of the shape change in the electrode are further aggravated when the separator also changes shape by swelling in three dimensions. The combined shape change of the electrode and the separator creates pressures in the latter which can rupture the same resulting in cell failure.

Many attempts have been made to prevent the formation of dentritic zinc and electrode shape change or to avoid the damaging consequences thereof. Thus, some success has been achieved with a pulsating charging current, electrolyte additives, electrolyte circulation, and the use of special separators.

More specifically, a great deal of attention is being given to the design of battery separators.

As may be gleaned from the above discussion, separator performance is one of the keys to the durability of secondary batteries, particularly zinc electrode containing batteries. The separator's ability to control the flow of electrolyte components plays a limiting role in determining maximum power to weight ratio, in maintaining a uniform zinc electrode shape, and in retarding the diffusion of certain ions, e.g., zincate to the cathode. Furthermore, initial electrolyte flow properties should not be altered by the accumulation of ZnO within the pores of the separator. Moreover, the separator is expected to survive the harsh oxidative alkaline environment of the electrolyte in the vicinity of the cathode for the target life of the cell.

Battery separators employed in the past can be segregated into two basic categories, namely, those which are diffusion limited and those which are limited by a mass transport mechanism.

A diffusion limited membrane as defined herein is one in which the exchange of soluble ionic species between one side of the membrane and the other, which occurs when the membrane is employed as a battery separator, does so as a result of the affinity of said ionic species for the membrane and the rate of said exchange is limited by the concentration gradient of said soluble ionic species which exists in the solution present at each side of the membrane for a given membrane thickness. The affinity of the ionic species for the membrane is similar to the affinity which a solute has for a solvent.

For example, cellulosic films (e.g., cellophane, sausage casing) have been the most common diffusion limited membranes employed as separators for a nickel-zinc cell. When such films are immersed in an electrolyte such as an aqueous solution of KOH they will absorb electrolyte and water. It is believed that the exchange of further electrolyte ions through the film occurs by a continuous dynamic process of intermittent attraction between the film and the electrolyte ions. During the course of this intermittent attraction the electrolyte ions exchange one site in the film for another and gradually make their way through the interior of the film until they reach the other side thereof. The pore size of a diffusion limited membrane is within the order of the molecular dimensions of the electrolyte and is therefore too small to permit a free or viscous flow of ions therethrough when an external force or pressure is applied to the electrolyte solution to force it through the film. It is only by increasing the concentration gradient that the rate of exchange can be increased. Thus, while the ionic exchange between the planar surfaces of the membrane is also limited by the thickness of the membrane, and the solubility of the ionic species, when these parameters are fixed it is the limitation on the rate of exchange of ionic species imposed by the concentration gradient which particularly characterizes diffusion limited membranes for purposes of the present invention. The dependence of the ionic exchange rate of diffusion limited membranes on the concentration gradient is disadvantageous since there is a limit to the concentration gradient which can be employed under high current density and in a real cell environment.

This necessarily limits the rate of ionic exchange which in turn limits charging and discharging rates of batteries which employ diffusion limited membranes as separators. While the disadvantages of diffusion limited membranes with respect to the functional relationship between rate of ionic exchange and concentration gradient can be compensated for to some extent by reducing the thickness of the membrane, this remedy is impractical since such membranes must possess a substantial thickness to exhibit sufficient mechanical strength and structural integrity necessary for handling and cell manufacture. Thus, the use of diffusion limited membranes as a battery separator imposes inherent limitations on charging and discharging rates on batteries employing the same. If the charging of discharging rate is too fast, local depletions of hydroxide ion occur, leading to electro-osmotic pumping and convective flow of electrolyte, which cause erosion and lateral shape changes on the zinc electrodes. Furthermore, cellulosic films are dimensionally unstable leading to rupture for the reasons noted above.

A mass transport limited membrane achieves exchange of ionic species not only by a diffusion mechanism (due to the presence of a concentration gradient) but also by actual transport of the ionic species through porous channels which are large enough to permit unimpeded viscous flow of the ions therethrough. Consequently, a mass transport limited membrane is limited the pore volume and thickness of the film. The exchange of ionic species between the planar surfaces of a mass transport limited membrane is much faster than would otherwise occur in a diffusion limited membrane. Consequently, the inherent limitations on charging and discharging rates imposed by the use of a diffusion limited membrane as a battery separator are absent. A mass transport limited membrane is therefore characterized by the ability to increase the flow of a liquid, such as an electrolyte, therethrough in response to an increase in pressure applied to one side of the membrane. A diffusion limited membrane will not exhibit this response without rupturing. For example, a microporous film prepared in accordance with Example 1, herein, will exhibit a flow of ethanol therethrough of 0.05 cc/cm$^2$/min. at a pressure drop of 760 mmHg while cellophane exhibits substantially no measurable flow of the same at the same pressure.

Aside from the aforedescribed limitations associated with cellulosic separators as a result of their being diffusion limited, the most limiting shortcoming of these separators is their degradation in the cell environment. Oxidation of the cellulose within the cell results in the formation of $CO_2$ as one of the products of oxidation which reacts with the electrolyte cation, such as potassium, forming for example potassium carbonate. The potassium carbonate increases the internal resistance of the cell. Since the $CO_2$ formation is a manifestation of the degradation of the membrane, the membrane can rupture permitting transfer of oxygen gas formed at the positive electrode upon overcharging thereby lowering of the cell capacity, inducing loss of negative electrode capacity, and increasing the risk of thermal runaway. Eventually the physical failure of the degraded cellulosic separator terminates the cell's life.

Various approaches used to cope with the degradation problem all involve compromises of cell characteristics and/or cost. For example, electrolyte concentrations above 40% KOH are used with cellulosic separators to reduce the degradation rate. However, at 31% KOH, where the cell's internal resistance would be the lowest, the degradation rate of cellophane is unacceptable.

Multiple layers of cellulose separators permit additional cycles, but at increased separator cost and weight gain, and an increase in internal resistance. Furthermore, due to inherent swelling characteristics of cellulose separator films it is difficult to pack several of such films in a space efficient fashion.

For example, U.S. Pat. No. 3,894,889 (see also U.S. Pat. No. 3,980,497) is directed to a process for preparing a laminated separator. In one embodiment the laminated separator comprises two bibulous, non-membranous separator layers, e.g., high grade microporous cellulosic filter papers, laminated together with a layer of gelling agent, such as cellulose acetate. In a second embodiment a semi-permeable membrane such as polyethylene is sandwiched between two gel coated bibulous layers. The sandwiched laminate is then hot pressed to form an integral smooth separator. The resulting laminate structures allegedly provide strength and protection to the semi-permeable membrane layer during battery cell assembly and operation. Thus, the gelling agent is used merely as a glue and cellulose acetate is not suggested as a means for rendering hydrophobic microporous open-celled membranes hydrophilic or for reducing pore plugging which occurs for example in a nickel-zinc cell. The laminate also results in an undesired weight pain in the separator and because of the thickness of the laminate separator it cannot be packed in a minimum of space. Moreover, the aforenoted laminated separator does not overcome the basic problem of degradation of the microporous cellulosic filter papers.

Microporous polypropylene which has a pore size in the order of 200 A is an example of a mass transport limited separator wherein the electrolyte balance is maintained by mass transport thereof through the pores. Because of the ease of electrolyte transport, concentration gradients do not build up during high rate charge and discharge, and convective flows and electroosmotic pumping effects are reduced. Furthermore, polypropylene is chemically inert in the cell environment, thus permitting operation at KOH concentrations favoring minimum cell internal resistance. Such mass transport limited films are not without their own disadvantages, however. For example, the pore structure of certain microporous films permits the transfer of zincate to the nickel compartment. As described above, after repeated cycling, zinc and zinc oxide accumulate in the separator. Furthermore, such microporous films can be penetrated by zinc dendrites which leads to catastrophic failure of the cell.

Attempts to circumvent the dendrite shorting problem using metal barrier layers are illustrated in U.S. Pat. Nos. 3,539,374; 3,539,396; 3,970,472; 4,039,729.

None of the above patents employs a polymer (e.g., cellulose acetate) coated microporous membrane to reduce dendrite shorting.

U.S. Pat. No. 1,172,183 describes an alkaline primary cell which employs two separator layers one being microporous propylene known as Celgard TM and disposed on top of this layer is one or more non-fibrous cellulose membranes such as cellophane. While the thickness of the cellophane layer is not disclosed, the fact that it is initially employed as an integral film suggests that its thickness is relatively substantial for handling purposes. Consequently, the double layer separator is distinct from the coated microporous films of the subject invention wherein the coating is substantially thinner than can be achieved using a separate cellophane film. Furthermore, there is no mention of the ability of cellophane to improve the wetting characteristics of the Celgard TM microporous film.

The search has therefore continued for a means of rendering normally hydrophobic microporous films highly hydrophilic and at the same time improving their capacity to act as a battery separator in primary and secondary batteries. The present invention was developed in response to this search.

It is therefore an object of the present invention to provide a hydrophilic microporous membrane which is rapidly wettable in aqueous, preferably alkaline aqueous solutions.

It is another object of the present invention to provide a process for rendering a normally hydrophobic microporous membrane hydrophilic.

It is still another object of the present invention to provide a hydrophilic microporous membrane which is substantially dimensionally stable in an alkaline solution.

It is a further object of the present invention to provide a hydrophilic microporous membrane which reduces the plugging of its pores by electrode derived ions, such as by zinc oxide, when employed as a battery separator for a nickel-zinc battery.

It is still another object of the present invention to provide a hydrophilic microporous membrane which retards the migration of silver ions therethrough when employed as a battery separator in a silver-zinc battery.

It is another object of the present invention to provide a secondary electrochemical cell containing a hydrophilic microporous film battery separator.

These and other objects and features of the invention will become apparent from the claims and from the following description of the preferred embodiments of the present invention.

SUMMARY OF THE INVENTION

In one aspect of the present invention there is provided a hydrophilic open-celled microporous membrane which comprises a normally hydrophobic microporous membane, having deposited on at least one surface thereof a coating comprising a polymer selected from the group consisting of cellulose esters and polyvinyl alcohol, said coating having a dry thickness of from about 1 to about 25 microns, and a surfactant disposed within said coated microporous membrane in a manner and in at least an amount sufficient to render the substrate microporous membrane hydrophilic.

In another aspect of the present invention there is provided a battery separator which comprises at least one of the aforedescribed coated microporous membranes.

In still a further aspect of the present invention there is provided an improved battery which employs the aforedescribed coated microporous membrane as a battery separator.

In still another aspect of the present invention there is provided a process for rendering a normally hydrophobic microporous membrane hydrophilic and reducing the electrical resistance thereof which comprises applying a coating to the surface of said membrane in a manner sufficient to achieve a coating thickness when dry of from about 1 to about 25 microns, said coating being selected from the group consisting of cellulose esters and polyvinyl alcohol; and impregnating said membrane with a surfactant in at least an amount and in a manner sufficient to render the membrane hydrophilic in the absence of said coating.

In a still further aspect of the present invention there is provided a process for reducing the penetration, of a battery separator which is disposed between a zinc anode and a cathode which constitute the electrodes of at least one rechargeable electrolytic cell employing an alkaline electrolyte, by electrode derived ions which comprises employing as the battery separator at least one of the aforedescribed coated microporous membranes.

DESCRIPTION OF THE PREFERRED EMBODIMENTS

In its broadest aspect the present invention is directed to a microporous membrane which has deposited thereon a thin coating of a polymer, such as cellulose acetate, on one or both sides thereof. The polymer coated membrane also has a suitable surfactant impregnated in at least the pores of the microporous substrate membrane itself and preferably also in the polymer coating itself.

The polymer coated film is beneficially employed as a separator in alkaline electrolyte primary or secondary battery cells.

The use of the polymer coating in conjunction with a surfactant, yields several advantages as a battery separator. By way of explanation and without wishing to be bound by any particular theory it is believed that a coating polymer, which possesses polar functional groups in the presence of an alkaline electrolyte, creates a boundary layer at the coating-electrolyte interface rich in polar functional groups. For example, when the polymer coating is cellulose acetate it hydrolyzes in the presence of alkaline electrolyte to convert the ester groups to free hydroxyl groups and acetic acid. The presence of the hydroxyl groups creates a hydroxyl rich boundary layer at the film-electrolyte interface. This polar boundary layer, e.g., hydroxyl rich boundary layer, exerts two important effects. The first effect is produced regardless of the type of battery electrode system in which the separator is employed, namely, it facilitates the absorption and diffusion of the electrolyte by and into the microporous membrane (which has been rendered hydrophilic by a surfactant as described herein) thereby substantially improving its hydrophilicity relative to microporous films impregnated or coated with equivalent amounts of conventional surfactants. This improvement in hydrophilicity is manifested by a reduction in the electrical resistance of the coated membrane and by an increase in the degree of absorbtion of the electrolyte by the substrate membrane. An additional advantage of the polymer coating is the creation of a barrier which helps to retain the surfactant within the coated membrane and thereby reduces the loss of surfactant which can occur when the dry membrane is stored for long periods of time. The improvement in electrical resistance (i.e., reduction) is unexpected because the polymer coating layer is not believed to be porous in the sense that a microporous film is. Consequently, the electrolyte passes through the polymer coating by a diffusion mechanism and once inside the film it moves by mass transport. However, because the polymer coating is not employed as a separate integral film (which film must posses sufficient mechanical strength to withstand the stress of handling and separator manufacture) the polymer coating thickness can be reduced substantially in comparison to an integral film thereof. Consequently, the increase in hydrophilicity of the film induced by the polymer coating reduces the electrical resistance of the coated membrane more than the diffusion barrier created by the coating increases the same and the resultant separator possesses an overall balance of beneficial properties.

The use of a surfactant in the manner described herein is required to at least render the substrate membrane hydrophilic. The microporous substrate membrane is normally hydrophobic and the beneficial effect of the hydroxyl rich boundry layer with respect to electrolyte absorption and diffusion is lost unless a surfactant is eventually disposed within the pores of the substrate membrane in such a manner as to render the same hydrophilic in the absence of the polymer coating. Once this minimum threshold of hydrophilicity has been imparted to the substrate membrane the polymer coating will improve the hydrophilicity of the membrane even further. Additional beneficial results can be achieved depending on the mode of application of the surfactant to the membrane as discussed hereinafter.

A second important beneficial effect of the coated membrane separator is observed depending on the type of electrode system employed in the battery. Nickel-zinc batteries as described herein cause plugging of the pores of the microporous separators by the precipitation of zincate ions as zinc oxide from the electrolyte solution when the discharging current is turned off. The coating on the substrate separator membrane, however, possesses a strong affinity for the soluble zincate ions and immobilizes them in solution at the coating-electrolyte interface before they penetrate the substrate membrane on which the coating is deposited. Since the penetration of the microporous membrane by zincate ions is substantially reduced pore plugging of the same is also substantially reduced.

While integral cellophane films, if used as a battery separator (i.e., regenerated cellulose), will also perform a similar function with respect to zincate ions, such films are much more dimensionally unstable than the coating on the microporous membrane of the present invention. For example, cellophane films swell substantially in three dimensions, namely, thickness, length and width when placed in an aqueous alkaline solution. In contrast, it has been found that the coating of the subject invention swells slightly and apparently only in one dimension, namely, thickness. The reasons for the difference in dimensional stability between the cellophane film and the subject polymer coating is not completely understood but is believed to be due in part to the tight bond which develops between the coating and the substrate membrane and in part to the thinness of the polymer coating.

The aforedescribed dimensional stability is particularly advantageous because it substantially reduces the danger that shape changes in the electrode will be magnified by three dimensional changes in the coated membrane to the extent that the electrode is damaged. Since the microporous membrane itself is dimensionally stable and only slight swelling in thickness occurs when the coated separator is contacted with aqueous alkaline electrolyte, several coated membranes can be stacked in a much smaller space than separators which comprise alternating layers of microporous and cellophane films. The use of a separator which comprises several layers of efficiently compactable coated membranes helps to offset the consequences commonly associated with the poor chemical stability and resultant degradation of cellulose based films in an aqueous alkaline environment. The ability to use a multilayered separator efficiently reduces the chances that pinpoint degradation of the polymer coating will occur at similar locations on each polymer coating layer to provide an unrestricted path of the zincate ions and/or zinc dendrites.

In a silver-zinc cell both the silver and zinc electrodes are soluble in contrast to a nickel-zinc cell wherein only the zinc electrode is soluble. Consequently, the polymer coated membrane in a silver-zinc cell not only ties up the soluble zincate ions as described above but also reacts with soluble silver ions in the electrolyte and thereby retards the flow of zinc ions in one direction and the flow of silver ions in the other direction.

A still further advantage of the cellulose acetate coated membrane is derived from the fact that some of the cellulose acetate becomes dissolved in the electrolyte as oxidized cellulose upon overcharging which is known to have a beneficial effect on maintaining cell capacity. (See for example *Alkaline Storage Batteries*, by Falk and Salkind p. 622 (1969) published by Wilely and Sons.)

In view of the above, the preferred form of the aforedescribed membrane is a mass transport limited open-celled microporous film.

Porous or cellular films can be classified into two general types: one type in which the pores are not interconnected, i.e., a close-celled film, and the second type in which the pores are essentially interconnected through tortuous paths which extend from one exterior surface or surface region to another, i.e., an open-celled film. The preferred porous films employed as the mass transport limited membrane in the present invention are of the latter type.

Further, the pores of the porous films employable as the membrane substrates of the present invention are microscopic, i.e., the details of their pore configuration or arrangement are discernible only by microscopic examination. In fact, the open-celled pores in the films generally are smaller than those which can be measured using an ordinary light microscope, because the wave length of visible light, which is about 5,000 A (an Angstrom is one ten-billionth of a meter), is longer than the longest planar or surface dimension of the open cell or pore. The microporous film substrates of the present invention may be identified, however, by using electron microscopy techniques which are capable of solving details of pore structure below 5,000 A.

The microporous film substrates of the present invention are also characterized by a reduced bulk density, sometimes hereinafter referred to simply as a "low" density. That is, these microporous films have a bulk or overall density lower than the bulk density of corresponding films composed of identical polymeric material but having no open-celled or other voidy structure. The term "bulk density" as used herein means the weight per unit of gross or geometric volume of the film where gross volume is determined by immersing a known weight of the film in a vessel partly filled with mercury at 25° C. and atmospheric pressure. The volumetric rise in the level of mercury is a direct measure of the gross volume. This method is known as the mercury volumenometer method, and is described in the *Encyclopedia of Chemical Technology*, Vol. 4, page 892 (Interscience 1949).

Mass transport limited porous films have been produced which possess a microporous, open-celled structure, and which are also characterized by a reduced bulk density. Films possessing this microporous structure are described, for example, in U.S. Pat. No. 3,426,754 which patent is assigned to the assignee of the present invention and herein incorporated by reference. The preferred method of preparation described therein involves drawing or stretching at ambient temperatures, i.e., "cold drawing", a crystalline, elastic precursor film in an amount of about 10 to 300% of its original length, with subsequent stabilization by heat setting of the drawn film under a tension such that the film is not free to shrink or can shrink only to a limited extent. Other methods of preparing microporous film are exemplified by U.S. Pat. Nos. 3,558,764; 3,843,762; 3,920,785; British Pat. Nos. 1,180,066 and 1,198,695 which are all herein incorporated by reference.

While all of the above-listed patents describe processes for preparing microporous films, the preferred microporous films are provided in accordance with the processes described in U.S. Pat. No. 3,801,404 which defines a method herein referred to as the "dry stretch" method and U.S. Pat. No. 3,839,516 which defines a method for preparing microporous films herein referred to as the "solvent stretch" method, both of which are herein incorporated by reference. Each of these patents discloses preferred alternative routes for obtaining a microporous film by manipulating a precursor film in accordance with specifically defined process steps.

The preferred precursor films which may be utilized to prepare microporous films in accordance with the "dry stretch" and "solvent stretch" methods are specifically detailed in each of the above respective patents. Thus, the "dry stretch" method utilizes a non-porous crystalline, elastic, polymer film having an elastic recovery at zero recovery time (hereinafter defined) when subjected to a standard strain (extension) of 50% at 25° C. and 65 percent relative humidity of at least 40%, preferably at least about 50% and most preferably at least about 80%.

Elastic recovery (ER) as used herein is a measure of the ability of a structure or shaped article such as a film to return to its original size after being stretched, and may be calculated as follows:

$$\% \ ER = \frac{\text{length when stretched} - \text{length after stretching}}{\text{length added when stretched}} \times 100$$

Although a standard strain of 50% is used to identify the elastic properties of the starting films, such strain is merely exemplary. In general, such starting films will have elastic recoveries higher at strains less than 50%, and somewhat lower at strains substantially higher than 50%, as compared to their elastic recovery at a 50% strain.

These starting elastic films will also have a percent crystallinity of at least 20%, preferably at least 30%, and most preferably at least 50%, e.g., about 50 to 90%, or more. Percent crystallinity is determined by the X-ray method described by R. G. Quynn et al in the *Journal of Applied Polymer Science*, Vol. 2, No. 5, pp. 166–173 (1959). For a detailed discussion of crystallinity and its significance in polymers, see *Polymers and Resins*, Golding (D. Van Nostrand, 1959).

Other elastic films considered suitable for preparing precursor films utilized in the "dry stretch" method are described in British Pat. No. 1,052,550, published Dec. 21, 1966.

The precursor elastic film utilized in the preparation of the microporous films by the "dry stretch" process route should be differentiated from films formed from classical elastomers such as the natural and synthetic rubbers. With such classical elastomers the stress-strain behavior, and particularly the stress-temperature relationship, is governed by entropy-mechanism of deformation (rubber elasticity). The positive temperature coefficient of the retractive force, i.e., decreasing stress with decreasing temperature and complete loss of elastic properties at the glass transition temperature, are particular consequences of entropy-elasticity. The elasticity of the precursor elastic films utilized herein, on the other hand, is of a different nature. In qualitative thermodynamic experiments with these elastic precursor films, increasing stress with decreasing temperature (negative temperature coefficient) may be interpreted to mean that the elasticity of these materials is not governed by entropy effects but dependent upon an energy team. More significantly, the "dry stretch" precursor elastic films have been found to retain their stretch properties at temperatures where normal entropy-elasticity could no longer be operative. Thus, the stretch mechanism of the "dry stretch" precursor elastic films is thought to be based on energy-elasticity relationships, and these elastic films may then be referred to as "non-classical" elastomers.

Alternatively, the "solvent stretch" method utilizes a precursor film which must contain at least two components, e.g., an amorphous component and a crystalline component. Thus, crystalline materials, which are by nature two components, work well with the process. The degree of crystallinity of the precursor film must therefore be at least 30%, preferably at least 40% and most preferably at least 50% by volume of the precursor film.

The polymers, i.e., synthetic resinous material from which the precursor films utilized in either process in accordance with the present invention include the olefin polymers, such as polyethylene, polypropylene, poly-3-methyl butene-1, poly-4-methyl pentene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1.

For example, in general when propylene homopolymers are contemplated for use in the "dry stretch" method, an isotactic polypropylene having a percent crystallinity as indicated above, a weight average molecular weight ranging from about 100,000 to 750,000 (e.g., about 200,000 to 500,000) and a melt index (ASTM-D-1238-57T, Part 9, page 38) from about 0.1 to about 75, (e.g., from 0.5 to 30), can be employed so as to give a final film product having the requisite physical properties.

It is to be understood that the terms "olefinic polymer" and "olefin polymer" are used interchangeably and are intended to describe a polymer prepared by polymerizing olefin monomers through their unsaturation.

Preferred polymers for use in the "solvent stretch" method are those polymers utilized in accordance with the invention described in U.S. patent application Ser. No. 44,805, filed June 2, 1979, by John W. Soehngen and assigned to the Assignee of the present invention, entitled "Improved Solvent Stretch Process for Preparing Microporous Films from Precursor Films of Controlled Crystalline Structure" the disclosure of which is herein incorporated by reference. Thus, a polyethylene homopolymer having a density of from about 0.960 to about 0.965 gm/cc, a high melt index of not less than about 3 and preferably from about 3 to about 20 and a broad molecular weight distribution ratio ($M_w/M_n$) of not less than about 3.8 and preferably from about 3.8 to about 13 is preferred in preparing a microporous film by the "solvent stretch" method. Moreover, nucleating agents may be incorporated into the polymer employed to prepare the precursor film as described in the incorporated Soehngen application in which case the polymers having a melt index as low as 0.3 may be employed.

The types of apparatus suitable for forming the precursor films are well known in the art.

For example, a conventional film extruder equipped with a shallow channel metering screw and a coat hanger die is satisfactory. Generally, the resin is introduced into a hopper of the extruder which contains a screw and a jacket fitted with heating elements. The resin is melted and transferred by the screw to the die from which it is extruded through a slit in the form of a film from which it is drawn by a take-up or casting roll. More than one take-up roll in various combinations or stages may be used. The die opening or slit width may be in the range, for example, of about 10 to 200 mils.

Using this type of apparatus, film may be extruded at a drawdown ratio of about 5:1 to 200:1, preferably 10:1 to 50:1.

The terms "drawdown ratio" or more simply, "draw ratio", as used herein is the ratio of the film wind-up or take-up speed to the speed of the film issuing at the extrusion die.

The melt temperature for film extrusion is, in general, no higher than about 100° C. above the melting point of the polymer and no longer than about 10° C. above the melting point of the polymer.

For example, polypropylene may be extruded at a melt temperature of about 180° C. to 270° C., preferably 200° C. to 240° C. Polyethylene may be extruded at a melt temperature of about 175° C. to 225° C.

When the precursor film is to be utilized in accordance with the "dry stretch" method, the extrusion operation is carried out with rapid cooling and rapid drawdown in order to obtain maximum elasticity and develop a row lamella structure. This may be accomplished by having the take-up roll relatively close to the extrusion slit, e.g., within two inches and, preferably, within one inch. An "air knife" operating at temperatures between, for example, 0° C. and 40° C., may be employed within one inch of the slit to quench, i.e., quickly cool and solidify, the film. The take-up roll may be rotated, for example, at a speed of 10 to 1000 ft/min, preferably 50 to 500 ft/min.

When the precursor film is to be utilized in accordance with the "solvent stretch" method, the extrusion operation is preferably carried out with slow cooling, in order to minimize stress and any associated orientation which might result from a fast quench to obtain maximum crystallinity and numerous small spherulites but yet fast enough to avoid developing large spherulites. This may be accomplished by controlling the distance of the chill roll take-up from the extrusion slit.

While the above description has been directed to slit die extrusion methods, an alternative method of forming the precursor films contemplated in this invention is the blown film extrusion method wherein a hopper and an extruder are employed which are substantially the same as in the slit extruder described above.

From the extruder, the melt enters a die from which it is extruded through a circular slit to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide different cooling rates. Means such as a cooling mandrel may be used to cool the interior of the tubular film. After a distance during which the film is allowed to completely cool and harden, it is wound up on a take-up roll.

Using the blown film method, the drawdown ratio is preferably 5:1 to 100:1, the slit opening 10 to 200 mils, preferably 40 to 100 mils, the $D_2/D_1$ ratio, for example, 1.0 to 4.0 and preferably about 1.0 to 2.5, and the take-up speed, for example, 30 to 700 ft/min. The melt temperature may be within the ranges given previously for slit die extrusion.

The extruded film may then be initially heat treated or annealed in order to improve crystal structure, e.g., by increasing the size of the crystallites and removing imperfections therein. Generally, this annealing is carried out at a temperature in the range of about 5° C. to 100° C. below the melting point of the polymer for a period of a few seconds to several hours, e.g., 5 seconds to 24 hours, and preferably from about 30 seconds to 2 hours. For polypropylene, the preferred annealing temperature is about 100° C. to 155° C.

An exemplary method of carrying out the annealing is by placing the extruded film in a tensioned or tensionless state in an oven at the desired temperature in which case the residence time is preferably in the range of about 30 seconds to 1 hour.

In the preferred embodiments, the resulting partly-crystalline precursor film is preferably subjected to one of the two alternative procedures described above to obtain a normally hydrophobic microporous film which may be utilized as the membrane substrate in the present invention.

The first preferred procedure as disclosed in U.S. Pat. No. 3,801,404, herein referred to as the "dry stretch" method, includes the steps of cold stretching, i.e., cold drawing, the elastic film until porous surface regions or areas which are elongated normal or perpendicular to the stretch direction are formed, (2) hot stretching, i.e., hot drawing, the cold stretched film until fibrils and pores or open cells which are elongated parallel to the stretch direction are formed, and thereafter (3) heating or heat-setting the resulting porous film under tension, i.e., at substantially constant length, to impart stability to the film.

The term "cold stretching" as used herein is defined as stretching or drawing a film to greater than its original length and at a stretching temperature, i.e., the temperature of the film being stretched, less than the temperature at which melting begins when the film is uniformly heated from a temperature of 25° C. and at a rate of 20° C. per minute. The term "hot stretching" as used herein is defined as stretching above the temperature at which melting begins when the film is uniformly heated from a temperature of 25° C. and at a rate of 20° C. per minute, but below the normal melting point of the polymer, i.e., below the temperature at which fusion occurs. As is known to those skilled in the art, the temperature at which melting begins and the fusion temperature may be determined by a standard differential thermal analyzer (DTA), or by other known apparatus which can detect thermal transitions of a polymer.

The temperature at which melting begins varies with the type of polymer, the molecular weight distribution of the polymer, and the crystalline morphology of the film. For example, polypropylene elastic film may be cold stretched at a temperature below about 120° C. preferably between about 10° C. and 70° C. and conveniently at ambient temperature, e.g., 25° C. The cold stretched polypropylene film may then be hot stretched at a temperature above about 120° C. and below the fusion temperature, and preferably between about 130° C. and 150° C. Again, the temperature of the film itself being stretched is referred to herein as the stretch temperature. The stretching in these two steps or stages must be consecutive, in the same direction, and in that order, i.e., cold then hot, but may be done in a continuous, semi-continuous, or batch process, as long as the cold stretched film is not allowed to shrink to any significant degree, e.g., less than 5% of its cold stretched length, before being hot stretched.

The sum total amount of stretching in the above two steps may be done in the range of about 10 to 300% and preferably about 50 to 150%, based on the initial length of the elastic film. Further, the ratio of the amount of hot stretching to the sum total amount of stretching or drawing may be from above about 0.10:1 to below 0.99:1, preferably from about 0.50:1 to 0.97:1, and most preferably from about 0.50:1 to 0.95:1. This relationship between the "cold" and "hot" stretching is referred to herein as the "extension ratio" (percent "hot" extension to the percent "total" extension).

In any stretching operation where heat must be supplied the film may be heated by moving rolls which may in turn be heated by an electrical resistance method, by passing over a heated plate, through a heated liquid, a heated gas, or the like.

After the above-described two stage or two step stretching, the stretched film is heat set. This heat treatment may be carried out at a temperature in the range from about 125° C. up to less than the fusion temperature, and preferably about 130° to 160° C. for polypropylene; from about 75° C. up to less than fusion temperature, and preferably about 115° C. to 130° C., for polyethylene, and at similar temperature ranges for other of the above mentioned polymers. This heat treatment should be carried out while the film is being held under tension, i.e., such that the film is not free to shrink or can shrink to only a controlled extent not greater than about 15% of its stretched length, but not so great a tension as to stretch the film more than an additional 15%. Preferably, the tension is such that substantially no shrinkage or stretching occurs, e.g., less than 5% change in stretched length.

The period of heat treatment which is preferably carried out sequentially with and after the drawing operation, should not be longer than 0.1 second at the higher annealing temperatures and, in general, may be within the range of about 5 seconds to 1 hour and preferably about 1 to 30 minutes.

The above described setting steps may take place in air, or in other atmospheres such as nitrogen, helium or argon.

A second preferred alternative procedure for converting the aforedescribed respective precursor film to a microporous film as described in U.S. Pat. No. 3,839,516 and herein referred to as the "solvent stretch" method includes the basic steps of (1) contacting the precursor film having at least two components (e.g., an amorphous component and a crystalline component), one of which is lesser in volume than all the other components, with a swelling agent for sufficient time to permit adsorption of the swelling agent into the film; (2) stretching the film in at least one direction while in contact with swelling agent; and (3) maintaining the film in its stretched state during removal of the swelling agent. Optionally, the film may be stabilized by heat-setting under tension or by ionizing radiation.

Generally, a solvent having a Hildebrand solubility parameter at or near that of the polymer would have a solubility suitable for the drawing process described herein. The Hildebrand solubility parameter measures the cohesive energy density. Thus, the underlying principle relies on the fact that a solvent with a similar cohesive energy density as a polymer would have a high affinity for that polymer and would be adequate for this process.

General classes of swelling agents from which one appropriate for the particular polymeric film may be chosen are lower aliphatic ketones such as acetone, methylethylketone, cyclohexanone; lower aliphatic acid esters such as ethyl formate, butyl acetate, etc.; halogenated hydrocarbons such as carbon tetrachloride, trichloroethylene, perchloroethylene, chlorobenzene, etc.; hydrocarbons such as heptane, cyclohexane, benzene, xylene, tetraline, decaline, etc.; nitrogen-containing organic compounds such as pyridine, formamide, dimethylformamide, etc.; ethers such as methyl ether, ethyl ether, dioxane, etc. A mixture of two or more of these organic solvents may also be used.

It is preferred that the swelling agents be a compound composed of carbon, hydrogen, oxygen, nitrogen, halogen, sulfur and contain up to about 20 carbon atoms, preferably up to about 10 carbon atoms.

The "solvent stretching" step may be conducted at a temperature in the range of from above the freezing point of the swelling agent, to a point below the temperature at which the polymer dissolves (i.e., ambient temperature to about 50° C.).

The precursor film employed in the "solvent stretch" process may range from about 0.5 to about 5 mils, or even thicker, subject to the electrical resistance requirements discussed herein.

In an alternative embodiment the precursor film is biaxially stretched in accordance with the procedures disclosed in U.S. Patent Application Ser. No. 44,801, filed on June 1, 1979, entitled "Improved Solvent Stretching Process for Preparing Microporous Films" and assigned to the assignee of the present invention, the disclosure of which is herein incorporated by reference. This process identifies preferred stretching conditions in a uniaxial direction which lead to improved permeability of the uniaxially "solvent stretched" microporous film. The uniaxially stretched microporous film can then be stretched in a transverse direction to improve the permeability even further. Thus, it is preferred that the precursor film be "solvent stretched" in a uniaxial direction not greater than about 350%, and most preferably 300% greater than its original length. Typically, additional stretching in the same direction after the solvent removal is not employed.

The optional stabilizing step may be either a heatsetting step or a cross-linking step. This heat treatment may be carried out at a temperature in the range from about 125° C. up to less than the fusion temperature and preferably about 130° to 150° C. for polypropylene; from about 75° C. up to less than fusion temperature, and preferably about 115° to 130° C. for polyethylene and at similar temperature ranges for other of the above mentioned polymers. This heat treatment should be carried out while the film is being held under tension, i.e., such that the film is not free to shrink or can shrink to only a controlled extent not greater than about 15 percent of its stretched length, but not so great a tension as to stretch the film more than an additional 15 percent of its stretched length. Preferably, the tension is such that substantially no shrinkage or stretching occurs, e.g., less than 5% change in stretched length.

The period of heat treatment which is preferably carried out sequentially with and after the "solvent stretching" operation, shouldn't be longer than 0.1 second at the higher annealing temperatures and, in general, may be within the range of about 5 seconds to 1 hour and preferably about 1 to 30 minutes.

The above described setting steps may take place in air, or in other atmospheres such as nitrogen, helium or argon.

When the precursor film is biaxially stretched the stabilizing step should be conducted after transverse stretching and not before.

While the present disclosure is directed primarily to the aforesaid olefin polymers in connection with their use in the "dry stretch" or "solvent stretch" procedures, the invention also contemplates the use of high molecular weight acetal, e.g., oxymethylene, polymers to prepare precursor films which can be rendered microporous as described herein. While both acetal homopolymers and copolymers are contemplated, the preferred acetal polymer for purposes of polymer stability is a "random" oxymethylene copolymer, which contains recurring oxymethylene, i.e., —CH$_2$—O—, units interspersed with —OR— groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and where a major amount of the —OR— units exist as single units attached to oxymethylene groups on each side. Examples of preferred polymers include copolymers of trioxane and cyclic ethers, containing at least two adjacent carbon atoms such as the copolymers disclosed in U.S. Pat. No. 3,027,352 of Walling et al. These polymers in film form may also have a crystallinity of at least 20 percent, preferably at least 30 percent, and most preferably at least 50 percent, e.g., 50 to 60 percent or higher. Further, these polymers have a melting point of at least 150° C. and a number average molecular weight of at least 10,000. For a more detailed discussion of acetal and oxymethylene polymers, see *Formaldehyde*, Walter, pp. 175-191, (Reinhold 1964).

Other relatively crystalline polymers, from which precursor films can be derived to which the "dry stretch" or solvent stretch methods may be applied, are the polyalkylene sulfides such as polymethylene sulfide and polyethylene sulfide, the polyarylene oxides such as polyphenylene oxide, the polyamides such as polyhexamethylene adipamide (nylon 660) and polycaprolactam (nylon 6), all of which are well known in the art and need not be described further herein for the sake of brevity.

The microporous films produced by the above described methods and which can be employed as substrates in the present invention, in a tensionless state, have a lowered bulk density compared with the density of corresponding polymeric materials having no open-celled structure, e.g., those from which it is formed. Thus, the films have a bulk density no greater than about 95% and preferably 20 to 40% of the precursor film. Stated another way, the bulk density is reduced by at least 5% and preferably 60 to 80%. For polyethylene, the reduction is 30 to 80%, preferably 60 to 80%. The bulk density is about 20 to 40% of the starting material, the porosity has been increased by 60 to 80% because of the pores or holes.

When the microporous film is prepared by the "dry-stretch" or "solvent stretch" methods the final crystallinity of the microporous film is preferably at least 30 percent, more preferably at least 65%, and more suitably about 70 to 85%, as determined by the X-ray method described by R. G. Quynn et al in the *Journal of Applied Polymer Science*, Vol. 2, No. 5, pp. 166-173. For a detailed discussion of crystallinity and its significance in polymers, see *Polymers and Resins*, Golding (S. Van Nostrant, 1959).

The microporous films which can be employed as substrates in the present invention and which can be produced by the aforenoted methods may also have an average pore size of from about 200 to about 10,000 A, typically from about 200 to about 5000 A, and more typically about 200 to about 400 A. These values can be determined by mercury porosimetry as described in an article by R. G. Quynn et al, on pages 21-34 of *Textile Research Journal*, January, 1963 or by the use of electron microscopy as described in Geil's *Polymer Single Crystals*, p. 69 (Interscience 1963). When an electron micrograph is employed pore length and width measurements can be obtained by simply utilizing a ruler to directly measure the length and width of the pores on an electron micrograph taken usually at 2,000 to 50,000 magnification. Generally, the pore length values obtainable by electron microscopy are approximately equal to the pore size values obtained by mercury porosimetry.

The microporous films which can be employed as substrates in the present invention will exhibit a surface area within certain predictable limits when prepared by either the "solvent stretch" method or the "dry stretch" method. Typically such microporous films will be found to have a surface area of at least 10 sq.m/gm and preferably in the range of about 15 to about 50 sq.m/gm. For films formed from polyethylene, the surface area generally ranges from about 10 to about 25 sq.m/gm. and preferably about 20 sq.m/gm, and for polypropylene from about 20 to about 50 sq.m/gm.

Surface area may be determined from nitrogen or krypton gas adsorption isotherms using a method and apparatus described in U.S. Pat. No. 3,262,319. The surface area obtained by this method is usually expressed as square meters per gram.

In order to facilitate comparison of various materials, this value can be multiplied by the bulk density of the material in grams per cc. resulting in a surface area expressed as square meters per cc.

A further characteristic of the microporous membranes which can be utilized in the instant invention is its porosity.

The porosity of the microporous film membranes suitable for use in the present invention may be defined as a percent ratio of the total volume occupied by the void space of a standard sample of microporous film to the bulk volume of the same sample which is the sum of the void space volume and the volume occupied by the solid material of the film itself. The % porosity is determined by measuring the thickness, length and width of a microporous film sample to determine the film's bulk volume. The film is then weighed and the density of the film is determined. The density of the polymer resin used to prepare the film is then determined. The % porosity is then calculated from the equation:

$$\% \text{ Porosity} = \left(1 - \frac{\text{density of film sample}}{\text{density of resin}}\right) \times 100$$

The porosity of the microporous film membranes suitable for use in the present invention and obtainable from the aforenoted methods may vary from about 30 to about 85%, preferably from about 30 to about 45%, and most preferably from about 35 to about 45%.

The above described microporous polymeric films which can be employed as substrate membranes in the instant invention have a thickness of from about 0.7 (0.001 inch) to about 8 mils, preferably from about 0.7 to about 4 mils; and most preferably from about 0.7 to about 2 mils (e.g., 1 mil).

In order to be useful as a battery separator the non-coated microporous substrate membrane should be capable of exhibiting an electrical resistance of not greater than about 50 milliohms-square inch (milliohms-in$^2$), preferably not greater than about 20 milliohms-in$^2$, and most preferably not greater than about 5 milliohms-in$^2$ when rendered hydrophilic as described herein.

Electrical resistance as defined herein is a measure of the ability of the microporous membrane to conduct ions. Consequently, as a general rule the higher the electrical resistance of the microporous film the less effective it will be as a battery separator.

Electrical resistance (direct current method) of a microporous film as defined herein and employed in the claims is determined by soaking a sample thereof having a known surface area (e.g., 0.2 sq. inches) in about a 40% by weight, solution of KOH in water for 24 hours. The resulting sample is then disposed between working platinum electrodes (i.e., anode and a cathode) immersed in an electrolyte of a 40%, by weight, solution of KOH in water and a direct current of known amperage (e.g., 40 milliamperes) is passed through the cell between the electrodes. The potential drop across the film (E') is measured with an electrometer. The potential drop across the cell without the microporous film disposed therein (E) is also determined using the same current. E is measured in millivolts.

The electrical resistance of the microporous film is then determined using the equation:

$$E.R. = \frac{(E' - E)A}{I}$$

where A is the surface area of the exposed film in square inches, I is the current across the cell in milliamperes, E.R. is the electrical resistance of the microporous film in milliohms-square inch, and E' and E are as described.

The above described microporous films prepared in accordance the aforenoted "dry stretch" and "solvent stretch" methods will exhibit the low electrical resistances, are mass transport limited when employed as a battery separator, are resistant to oxidation, and in general possess all of the properties which are deemed necessary to render them commercially suitable for use as microporous substrates in the present invention.

However, it is contemplated that any conventional normally hydrophobic microporous substrate membrane commonly used in battery separators which is mass transport limited and preferably those which possess the aforenoted pore structure, and electrical resistance, regardless of how they are made or the material from which they are derived may be employed as the substrate for the barrier material coating.

Furthermore, the substrate membrane to which the polymer coating is applied may comprise any of the metal coated microporous membranes described in U.S. Patent Application Ser. No. 125,195, filed Feb. 27, 1980 entitled "Coated Open-celled Microporous Membranes" by H. Taskier the disclosure of which is herein incorporated by reference. The polymer coating can be applied to either the metal coated surface, the film surface when only one side is metal coated or both.

The present invention not only provides a substrate with uniform and highly advantageous mass transport properties but because of the uniformity of its overall pore structure it permits the development of uniform coatings deposited thereon.

While the preferred configuration of the substrate membrane is a film, preferably an embossed film for reasons described hereinafter, the substrate membrane may possess other configurations which render it suitable for its intended end use, such as a battery separator, which is within the skill in the art including fibers, tubes (e.g., hollow fibers), bags, and the like.

Alternatively, the microporous substrate membrane may comprise a microporous film, such as that prepared by the aforenoted "dry stretch" or "solvent stretch" methods which have a non-woven fibrous felt embossed on at least one surface of the same. Such non-woven felts preferably comprise substantially continuous randomly arranged filamentary material, particularly polyolefins such as polypropylene of varying crystallinity, and typically of varying diameter, which extend generally parallel to the plane of the film, thermally bonded to itself at randomly located filament crossover points and to the film at randomly located contact points between the filamentary material and the film. Such laminates are preferably prepared by spray spinning and spun bonding techniques or by lamination of a previously formed spun-bonded non-woven web to the microporous membrane. Other suitable filamentary materials in addition to polyolefins include cellulose acetate, polyamides, polyacetals, polyalkylene sulfides, and polyarylene oxides. The resulting thermally bonded filamentary layer-microporous film laminate is then embossed i.e., pressed between moving embossing rolls or rollers heated to elevated temperatures of about 100° to about 150° C. in a conventional calendering machine. The embossing of the laminate imparts raised or projected design ridges in relief on the surface thereof which have the advantageous effect of providing gas channels for escape of gases upon overcharge. The embossed laminate also has the additional advantage of providing a buttress effect for the polymer coating when applied to the fiber containing side thereof which further improves the adhesion of the coating to the substrate membrane.

The thickness of the embossed non-woven filamentary layer typically will vary from about 1 to about 10 mils, preferably from about 1 to about 7 mils, and most preferably from about 1 to about 5 mils. The filamentary layer is preferably deposited to cover an area which is coextensive with the surface of the substrate membrane on which it is placed.

The filamentary material which is spray spun, and spun-bonded, on the surface of the microporous film typically has a denier per filament (dpf) of from about 0.5 to about 5, preferably from about 1 to about 4 dpf, and most preferably from about 2 to about 3.5 dpf. The thickness of the laminate will generally be from about 2 to about 8 mils (e.g., 3 mils).

Alternatively, an integral non-woven web can be first prepared, for example, by a spray spinning technique, and this web then laminated to the microporous membrane by embossing as described in U.S. Pat. No. 3,679,540, the disclosure of which is herein incorporated by reference.

The description and preparation of the microporous film non-woven filamentary laminate by spray spinning which can be embossed is provided in U.S. Pat. No. 3,932,682 the disclosure of which is herein incorporated by reference. A more detailed description of the preferred spray spinning technique used to prepare said laminates or non-woven felt webs is provided in U.S. Pat. No. 3,543,332 the disclosure of which is also herein incorporated by reference.

The coating polymers which are capable of achieving the aforedescribed advantages when coated on the microporous membrane are those which can absorb water and swell in an aqueous alkaline environment. Such water absorption properties are derived from the presence, in an aqueous alkaline environment, of functional groups such as hydroxyl groups which thereby impart to the coating the capability of hydrogen bonding with water and of transporting electrolyte through the coating by diffusion, at least when the coating has a suitable surfactant incorporated (i.e., uniformly distributed) therein.

Other examples of suitable functional groups include carboxyl, anhydride, and amino groups.

The preferred class of polymers employed in the coating include cellulose esters exemplified by cellulose acetate, cellulose triacetate, cellulose butyrate, propionate and the like, and mixed cellulose esters exemplified by cellulose acetate propionate, and cellulose acetate butyrate. The most preferred cellulose ester is cellulose acetate.

The preferred cellulose acetate is supplied in the form of secondary cellulose acetate flake containing from about 52 to 56% of combined acetic acid. Typically, a 20% solution of such cellulose acetate in a solvent comprising 9 parts acetone and 1 part ethanol has a viscosity of between about 21 and 82 seconds when determined by the falling ball method (ASTM D 851-56) using a stainless steel ball 3/32 inch in diameter.

Other classes of suitable coating polymers include polyvinyl alcohol.

The polyvinyl alcohol preferably has a number average molecular weight of from about 125,000 to about 135,000, a viscosity at 25° C. in water of from about 25 to about 45 cps and a degree of hydrolysis of from about 85 to about 99.8%.

The surfactant which is employed in conjunction with the coating polymer is employed to achieve at least wetting of the microporous substrate membrane by the electrolyte and works in conjunction with the polymer to improve the hydrophylicity of the resulting end product.

The surfactant is preferably chosen to be at least partially compatible with the coating polymer (i.e., the membrane remains essentially clear after impregnation) and has the effect of plasticizing the latter to facilitate coating of the microporous membrane, and also is preferably soluble or dispersable in the solvent used to prepare the coating polymer solution.

Accordingly, any surfactant conventionally employed to render microporous membranes hydrophilic may be employed subject to the aforenoted compatibility requirement.

As used herein the term "hydrophobic" is defined as meaning a surface which passes less than about 0.010 milliliter of water per minute per sq. cc. of flat film surface under a water pressure of 100 psi. Likewise the term "hydrophilic" is meant to be applied to those surfaces which pass greater than about 0.01 milliliter of water per minute per sq. cc. at the same pressure.

Accordingly, any surfactant which, when applied to the microporous substrate membrane alone (i.e., in the absence of the coating polymer), lowers the surface tension thereof to the extent that the substrate will exhibit a contact angle with water of less than about 80°, preferably less than about 60°, will render said substrate hydrophilic and can be employed in conjunction with the coating polymer.

Representative examples of suitable preferred surfactants include silicon glycol copolymers, such as polyoxyethylene polymethyl siloxane, either alone or in combination with an imidazoline tertiary amine as described in U.S. Pat. No. 3,929,509 the disclosure of which is herein incorporated by reference. Other suitable preferred surfactants include phosphate esters such as ethoxylated 2-ethyl-hexyl phosphate. Also included are any of the hydrophilic organic hydrocarbon monomers disclosed in U.S. Patent Application Ser. No. 071,644, filed Sept. 4, 1979 entitled "Hydrophilic Monomer Treated Microporous Film" by Nelson Lazear such as acrylic acid, methacrylic acid, vinyl acetate and mixtures thereof, which preferably are chemically fixed within the microporous substrate membrane in accordance with the procedures described therein. The disclosure of this application is herein incorporated by reference. Further suitable surfactants include those described in U.S. Pat. No. 3,472,700 and Canadian Pat. No. 981,991 the disclosure of which is herein incorporated by reference.

The coating polymer is applied to the surface of the microporous membrane by mixing the same in a suitable solvent which preferably contains at least one of the aforenoted surfactants. The concentration of the polymer in the solvent typically will vary from about 1 to about 25% and preferably from about 2 to about 15%, by weight, based on the polymer solution weight.

The resulting polymer solution is then coated on the surface of the microporous substrate membrane using any suitable coating means such as roll coating, reverse roll coating, coating by means of wire wound rods and the like. Upon drying of the coating, a thin coating of the polymer is produced on the surface of the microporous substrate.

Suitable solvents for combining the cellulose ester polymer, and surfactant include ketones such as acetone, methylethylketone, methylene chloride/methanol mixtures (e.g., 1:1 w/w) and ethers such as ethylene glycol monomethyl ether also known as methyl "Cellosolve" TM. Suitable solvents for the polyvinyl alcohol include water, ethanol, methanol and the like and mixtures thereof. In short, any solvent which dissolves the coating polymer and will not adversely affect the microporous membrane when applied to the surface thereof may be employed.

It is to be understood that the means for applying the coating composition to the surface of the microporous substrate membrane is not restricted to solutions of volatile organic solvents. Aqueous, dispersions of the polymer and surfactant may also be employed as the vehicle from which the coating is laid down on the surface of the microporous substrate.

The surfactant can be applied to the microporous substrate membrane by at least two different alternative embodiments or combinations of the same. In the preferred embodiment the surfactant is mixed with the polymer coating solution and the mixture is applied to the surface of the substrate membrane. Alternatively, the surfactant is impregnated into the substrate membrane by conventional means either before or after the same is coated with the polymer solution which may or may not contain additional surfactant. The effects induced by the surfactant will differ depending on the method of its application.

Regardless of the method of application, the amount of surfactant which is employed in conjunction with each method is sufficient to at least render the substrate membrane hydrophilic in the absence of the polymer coating. To achieve an optimum reduction in electrical resistance, however, more than the minimum amount of surfactant should be employed. The particular amounts employed for each embodiment and the effects produced thereby are described hereinafter.

When the surfactant is mixed with the polymer coating it serves two important functions, namely, it facilitates adsorbtion of the alkaline electrolyte by the coating deposited on the microporous membrane, and more importantly, when the solvent evaporates through the substrate membrane, the surfactant is carried along therewith, deposited in the pores of the substrate membrane, and thereby renders the same hydrophilic. The use of a surfactant is necessary since the polymer coating is not capable of penetrating the pores of the microporous membrane and consequently the polymer cannot, by itself, render the microporous film hydrophilic.

The reason the surfactant is preferably mixed with the coating polymer is to ensure the most efficient use of the same and prevent undue loss thereof which can occur when the coating polymer application vehicle is a solvent for the surfactant. For example, while it is possible to impregnate the microporous membrane with surfactant and then apply the coating polymer solution to the film surface, such a sequence can result in penetration of the film by the solvent of the polymer solution thereby washing the surfactant out of the film. Similar problems can result where the substrate membrane is coated with the polymer coating first and then impregnated with a surfactant solution. If the surfactant solvent vehicle is also a solvent for the polymer coating the latter can be removed during surfactant impregnation.

Thus, while the preferred embodiment wherein the surfactant and a coating polymer are mixed achieves the most beneficial results described hereinafter and is believed to represent the most efficient embodiment, beneficial results are also achieved when the surfactant is initially applied to the substrate microporous membrane itself by means other than via the coating polymer solution provided the polymer coating is not adversely influenced thereby.

In those embodiments where the surfactant is applied directly to the microporous membrane any method known in the art for achieving this objective (e.g., coating or impregnating) can be employed as described in U.S. Pat. No. 3,929,509. In this embodiment simply passing the microporous substrate membrane through a solution of the surfactant is the preferred method of surfactant application.

The amount of surfactant which is admixed with the polymer coating for application to the substrate membrane will vary depending on the identity of the surfactant and can be any amount which is effective to (a) render the microporous substrate membrane hydrophilic as defined herein so that the electrolyte can pass through the substrate membrane after it diffuses through the polymer coating, and preferably also effective to (b) facilitate and increase the rate of absorption of the alkaline electrolyte by the polymer coating and thereby to facilitate diffusion of said electrolyte through the coating into the substrate membrane. Accordingly, in order to achieve the minimum acceptable effect such amounts must at least be effective to provide sufficient surfactant to enable it to pass into the microporous substrate membrane as described herein. Thus, while any effective amount of the surfactant may be mixed with the polymer it is preferred that such amounts constitute from about 20 to about 200%, preferably from about 50 to about 70%, and most preferably from about 100 to about 150%, by weight, based on the weight of the coating polymer.

When the surfactant is applied directly to the substrate membrane itself, it is impregnated and deposited in the pores of the same in amounts which would at least render the uncoated substrate membrane hydrophilic as described herein. Accordingly, in this embodiment while any effective amount of surfactant may be impregnated into the microporous substrate membrane it is preferred that such amount constitute from about 8 to about 40%, preferably from about 10 to about 30%, and most preferably from about 20 to about 30%, by weight, based on the weight of the uncoated substrate membrane. Such amounts therefore also define the amount of surfactant which preferably should eventually pass into the pores of the substrate membrane to render it hydrophilic when the same is applied via the preferred embodiment, namely, by the polymer coating.

In both of the aforenoted embodiments, while a surfactant impregnated substrate membrane alone is considered to be hydrophilic, the presence of the polymer coating thereon improves the membrane's hydrophilic nature even further as evidenced by a reduction in electrical resistance in relation to the uncoated film impregnated with an equivalent amount of surfactant.

The thickness of the polymer coating is governed by the desire to increase the hydrophilicity of the uncoated microporous substrate membrane as much as possible and at the same time to reduce plugging of the pores of the substrate membrane by electode derived ions when the same is employed as a battery separator.

Accordingly, the dry thickness of the polymer coating on any one surface of the substrate membrane is controlled to be from about 1 to about 25 microns (e.g., 1 to about 15), preferably from about 1 to about 10 microns, and most preferably from about 2 to about 5 microns.

The polymer coating is preferably applied to the substrate membrane over an area which is substantially co-extensive with the surface of said membrane.

The ability of the above described polymer coated microporous substrate membranes to achieve the afore-described properties renders them paticularly suitable for use as battery separators in any primary or secondary battery and particularly for any zinc or silver electrode secondary battery. When employed for this purpose the number of coating layers and their arrangement on the microporous substrate membrane can vary and is governed by the needs of the battery in terms of its performance. Thus, using a microporous film as an example of a suitable substrate, the film may have the polymer coating on one or both sides thereof. Alternatively, two microporous films having a single polymer coating on one side of each film may be arranged together with the coated film surfaces facing each other or facing away from each other. This same type of arrangement can be achieved by folding a single microporous film which is coated on only one side thereof so that the coated surfaces of each half are faced as described above.

The polymer coated films because of their increased hydrophilicity can be used to perform any function commonly performed by conventional membranes, preferably microporous membranes which are employed in battery separators.

For example, the polymer coated membrane can be used to wrap various types of films and sheets of dendrite barrier layers such as disclosed in U.S. Pat. Nos. 3,539,396; 3,970,472; and U.S. patent application Ser. No. 125,195, filed Feb. 27, 1980 entitled "Coated Opencelled Microporous Membranes", by H. Taskier, the disclosures of which are herein incorporated by reference. These patents and application disclose battery separators which contain nickel layers which must be electrically insulated from the electrodes. Such insulation can be provided by the polymer coated membranes of the subject invention.

Alternatively, the polymer coated membrane can be employed as a dendrite barrier layer itself by using one or more layers of polymer coated membrane to control dendrite growth.

The batteries in which the polymer coated membrane can be employed as a separator include any primary or secondary cell which uses an aqueous alkaline electrolyte.

The preferred battery is a secondary battery which employs a zinc anode and any conventional positive electrode suitable for use with alkaline electrolytes including mercury oxide, manganese oxide, silver oxide, and preferably nickel oxide.

Suitable alkaline electrolytes which are employed in conjunction with such electrodes include aqueous solutions of potassium hydroxide, lithium hydroxide, sodium hydroxide and mixtures thereof at concentrations of from about 20 to about 45%, by weight, based on the weight of the solution.

The above described polymer coated microporous substrate membranes offer a unique set of advantages which heretofore have been unachieveable in the prior art. Such coated substrate membranes are extremely compact and much thinner than the metal coated screens, non-woven and woven cloths, nettings perforated plates and diffusion membranes of the prior art. Consequently, the power to weight ratio of batteries employing the subject coated membranes can be increased substantially since many more cells can be constructed in a given area.

Moreover, because of the thinness of the coated membranes and their low electrical resistance, the use of the same as a battery separator reduces the internal resistance of the cell compared to other known thicker battery separators thereby increasing the cell's efficiency, and capacity. In addition, the coated microporous substrate membranes described herein are flexible, possess good mechanical properties, and are extremely cost efficient to manufacture, as well as extremely efficient in their operation. They can withstand repeated charge-discharge cycling without gradual loss of power, and result in a cell which is extremely resistant to shape change.

The following Examples are given as an illustration of the claimed invention. It should be understood, however, that the invention is not limited to the specific details set forth in the Examples. All parts and percentages in the Examples as well as in the remainder of the specification are by weight unless otherwise specified.

EXAMPLE 1

PART A

Crystalline polypropylene having a melt flow index of about 5.0 and a density of 0.905 gm/cc is melt extruded at a temperature of about 230° C. through a 12 inch diameter blown film die. The film is inflated to provide a blow-up ratio, or $D_2/D_1$ ratio, of 1.1. The film is then taken up at a drawdown ratio of 75:1. The non-porous precursor film produced in this fashion is found to have the following properties: thickness, about 1 mil (0.001 inch); recovery from 50% elongation at 25° C., 90.5%; crystallinity, 68.8%.

A sample of this film is oven annealed with air with a slight tension at 145° C. for about 23 minutes, removed from the oven and allowed to cool.

The sample of the annealed elastic precursor film is then subjected to cold stretching and hot stretching at an extension ratio of 0.8, i.e., 20% cold, 80% hot, and thereafter heat set under tension, i.e., at constant length, at 145° C. for 10 minutes in air. The cold stretching portion is conducted at 25° C., the hot stretching portion is conducted at 145° C., and total draw is 100%, based on the original length of the elastic film. The resulting film has an open-celled pore structure as defined herein, an effective pore size of about 400 Angstroms, a porosity of 45%, a density of 0.49, a crystallinity of about 59.6%, and a thickness of 1 mil. Several film samples are prepared as described above and each is designated Film A.

PART B

Part A is repeated with the exception that the polypropylene employed to form the precursor has a melt flow index of about 0.7, and a density of 0.920 gm/cc.

The resulting microporous film exhibits an effective pore size of about 200 Angstroms, a porosity of 38%, a density of 0.56 gm/cc and a thickness of 1 mil. Several samples are prepared and designated Film B.

PART C

Microporous film samples prepared in accordance with Part B are employed as a substrate for the deposition of a non-woven felt embossed layer.

Accordingly, polypropylene is spray spun at a melt temperature of 350° C. through a 0.016 inch diameter nozzle, using jets of steam superheated to 405° C. and at 21 psi to attenuate the melt stream of polymer into a continuous filamentary material characterized by a denier per filament ranging from about 1 to about 4. The filamentary material is collected on a revolving drum having a smooth metal surface spaced from the extrusion orifice at a distance of about 2 feet. The drum is rotated at a speed and for a time sufficient to produce a non-woven web weighing about 0.5 oz. per square yard. The resulting non-woven web is then laminated to samples of Film B using an embossing roll heated to a temperature of about 120° C.

The resulting felt coated embossed film has a thickness of about 4 mils. These film samples are designated Film C.

PART D

A microporous film sample prepared in accordance with Example 1, Part A is coated on one side with a nickel coating by means of a sputtering technique. The thickness of this coating is about 350 Angstroms. The resulting nickel coated film is referred to herein as film D.

PART E

The following components are mixed together as shown at Table 1.

TABLE 1

| Component | Parts by Wt. |
| --- | --- |
| Cellulose acetate[1] | 5 |
| Victawet 12[2] | 5 |
| Acetone | 90 |
| | 100 |

[1]The cellulose acetate is characterized by an acetyl value of 55 ± 0.35, a viscosity at 25° C. as determined from a 6% solution thereof in acetone of 105 ± 25 cps, and a density of about 23 gm/cc.
[2]Victawet 12 ® is a phosphoric ester surfactant of ethoxylated 2-ethyl hexyl phosphate available from Stauffer Chemical Co.

The resulting composition is applied to both sides of a sample of Film B (Part B of Example 1) using a #16 coating bar. The resulting film coating has a thickness of 0.1 mil, the coated film has an average coating weight of 1.76 gm/ft$^2$ and the weight of the coating is 0.4 gm/ft$^2$ of film surface or an add-on of 29.7%, by weight, based on the weight of the uncoated film. The resulting coated film is dried in an oven at 175° F. and then tested immediately for electrical resistance using a 40% solution of KOH as described herein which is found to be 6 milliohms-in$^2$ (average). These results are also shown at Table II, run 4.

PART F

Several additional polymer film coated samples are prepared in accordance with Part E and the identity of the substrate membrane, the number of sides coated with the polymer, the composition of the polymer solution from which the polymer coating is applied, and surfactant are varied. The appropriate processing conditions employed in the coating procedure are shown at Table II.

Three control samples (i.e., runs 1 to 3) are prepared by immersing microporous film samples in a solution of a surfactant for a period of time sufficient to obtain an add-on of surfactant as shown at Table II. The silicone glycol-imidazoline surfactants employed comprise a 6% solution of a blend of an imidazoline surfactant available under the trademark Wictamid AL42-12 TM from Witco Chemical and a polyoxyethylene polymethyl siloxane surfactant available under the tradename Dow-193 TM. The weight ratio of each surfactant in the blend is 1:1 and the solvent is acetone. The add-on of surfactant is determined after the solvent has evaporated therefrom. When Victawet-12 surfactant is employed it is applied to the control film samples from a 6% solution thereof in acetone.

Table II also shows the method of application of the surfactant to the film. The concentration of the polymer and the weight ratio of the polymer to surfactant in the solution is shown at Table II.

The substrate film type is identified by the letters A to D which correspond to film samples A to D in Example 1.

The electrical resistance of each film sample is measured and the results shown at Table II.

As may be seen from the data of Table II the cellulose acetate coated films in most instances exhibit a reduction in the electrical resistance in relation to the corresponding uncoated, microporous films treated only with surfactant. The lower E.R. of the film sample of run 10 in relation to its corresponding control (i.e., run 3) is believed to be attributable to the lower amount of surfactant possessed by the run 10 sample with respect to the latter. At similar surfactant levels the cellulose acetate coated film would be expected to exhibit a lower E.R. in relation to the control sample. Similar considerations also apply with respect to runs 7–9.

TABLE II

| Run No. | Substrate Film Type | Surfactant Type | Method of Surfactant Application | Polymer Type | Solvent For Polymer | Polymer Conc in Solution (%) | Wt. Ratio of Surfactant to Polymer in Solution | No. of Sides of Film Coated With Polymer | Add-on of Polymer and Surfactant (%) | Add-on of Surfactant (%) | E.R. (milliohms-in$^2$) |
| --- | --- | --- | --- | --- | --- | --- | --- | --- | --- | --- | --- |
| 1 (control) | B | Victawet-12 | immersion of uncoated film in 6% surfactant solution of acetone | None | N/A | N/A | N/A | None | N/A | 14–20 | 6 |
| 2 (control) | B | silicone glycol-imidazoline blend | immersion of uncoated film in 6% surfactant solution of acetone | None | N/A | N/A | N/A | None | N/A | 12–17 | 8 |
| 3 (control) | A | Victawet-12 | immersion of uncoated film in 6% surfactant solution of acetone | None | N/A | N/A | N/A | None | N/A | 14–20 | 2.5 |
| 4 | B | Victawet-12 | PS | CA | acetone | 5 | 1:1 | 2 | 29.7 | 14.9 | 6 |
| 5 | B | Victawet-12 | PS | CA | ace- | 5 | 1:1 | 1 | 20 | 10 | 5 |

TABLE II-continued

| Run No. | Substrate Film Type | Surfactant Type | Method of Surfactant Application | Polymer Type | Solvent For Polymer | Polymer Conc in Solution (%) | Wt. Ratio of Surfactant to Polymer in Solution | No. of Sides of Film Coated With Polymer | Add-on of Polymer and Surfactant (%) | Add-on of Surfactant (%) | E.R. (milli-ohms-in$^2$) |
|---|---|---|---|---|---|---|---|---|---|---|---|
| 6 | B | Victawet-12 | PS | CA | acetone | 5 | 1:1 | 2 | 30 | 15 | 4.6 |
| 7 | B | Victawet-12 | immersion of uncoated film in 6% surfactant solution of acetone | PVA | ethanol | 10 | N/A | 1 | 15-20 | 7.5-10 | 8 |
| 8 | B | Victawet-12 | immersion of uncoated film in 6% surfactant solution of acetone | PVA | ethanol | 5 | N/A | 2 | 20-30 | 10-15 | 9 |
| 9 | A | Victawet-12 | immersion of uncoated film in 6% surfactant solution of acetone | PVA | ethanol | 5 | N/A | 2 | 20-30 | 10-15 | 5 |
| 10 | A | Victawet-12 | roll coating bar using 6% surfactant solution in acetone | CA | acetone | 5 | 1:1 | 1 | 20 | 10 | 3 |
| 11 | C | silicone glycol-imidazoline blend | immersion in 6% surfactant solution of acetone | None | N/A | N/A | N/A | N/A | N/A | 8 | 22.2 |
| 12 | C | * | ** | CA | acetone | 5 | 1:1 | 1 | 18 | 12 | 14.8 |
| 13 | B | Victawet-12 | PS | CTA | methylene chloride/methanol (9:1) | 2.5 | 2.1 | 1 | 40 | 20 | 4.2 |
| 14 | D | Victawet-12 | PS | CA | acetone | 5 | 1:1 | nickel side | 26 | 13 | 1.5 |

N/A = not applicable
CA = cellulose acetate (see description in Part D)
PVA = polyvinylalcohol (number average mol. wt. 133,000; % hydrolyzed 99.8%)
CTA = cellulose triacetate - acetyl value 61.6 + .25/−.04
PS = polymer solution
* = Uncoated film is first impregnated with the silicone glycol-imidazoline blend.
** = The presurfactant impregnated film is then coated with a polymer solution which contains a different surfactant, I.e., Victawet-12.

EXAMPLE 2

The following example serves to illustrate the reduction in pore plugging achieved by use of the coated microporous film described herein.

A microporous film sample prepared in accordance with Example 1, Part E is provided, and a control film sample which is prepared by impregnating Film B (see Example 1, Part B) with Victawet 12 surfactant (i.e., by immersing in a 6% solution of surfactant in acetone) to achieve an add-on of surfactant of about 15%, based on the weight of the microporous film alone. These two film samples are immersed in separate vessels containing a 31% aqueous solution of KOH saturated with zinc oxide for a period of about 48 hours. Specimens from each film sample are removed from the solution and blotted dry.

Both samples are then observed visually under a microscope. The control film sample containing only surfactant exhibits a white opaque appearance and when viewed under a microscope fine white particles of zinc oxide are observed imbedded throughout the film. In contrast the polymer coated film, when viewed under a microscope exhibits a fine white deposit only on the surface of the polymer coating.

The air Gurley (ASTM D-726 B) of the polymer coated film sample after immersion is determined to be 68 seconds. This film sample is then washed with water and dried and the air Gurley again measured and found to be 31 seconds. The polymer coated film sample is then soaked in acetone to remove the polymer coating and the air Gurley value is found to be 32 seconds.

The dry weights of both film samples are measured before and after immersion in KOH-zinc oxide solution to determine the add-on attributable to zinc-oxide. The add-on of zinc oxide of the control film sample is found to be 20%, by weight, and the add-on of the polymer coated film sample is found to be 5%, by weight, based on the weight of the respective film samples just prior to immersion.

The above test results indicate that penetration and absorption of the microporous film by zinc ozide is substantially reduced by the polymer coating.

EXAMPLE 3

The following example is conducted to illustrate the improvement in hydrophilicity, by measuring the electrical resistance, and electrolyte absorption of the polymer coated microporous films.

A film sample coated with a cellulose acetate-surfactant solution prepared in accordance with Example 1, Part E, and a control film sample, i.e., Film B (see Example 1, Part B) impregnated with a 6% solution of Victawet 12 surfactant in acetone to achieve a surfactant add-on of about 15% are dried for 24 hours at 150° F. and allowed to cool to ambient conditions and weighed. Both film samples are immersed in a 40% aqueous solution of KOH for 24 hours. Specimens of each film sample are cut into 2 inch squares and their weight recorded.

The electrical resistance (as described herein) and electrolyte absorption are then determined and the results shown at Table III.

TABLE III

| Film Sample Type | E.R. (milliohms-in$^2$) | Electrotype Absorption (%) |
| --- | --- | --- |
| Polymer coated film sample | 7.1 | 106 |
| control | 8.5 | 68 |

The above data illustrates that both the electrical resistance and electrolyte absorbtion of the cellulose acetate polymer coated film are substantially improved in relation to the control.

EXAMPLE 4

The following Example illustrates the dimensional stability of the polymer coated films of the present invention in relation to cellophane films.

Cellulose acetate coated microporous films prepared in accordance with Example 1, Part E, are immersed in a 40% aqueous solution of KOH for 48 hours. The length, width and thickness of the film sample is measured before and after immersion, i.e., dry and then wet. The length is measured in the machine direction (i.e., direction of cold and hot stretch during film formation), the width is measured in the transverse direction (i.e., perpendicular to the direction of cold and hot stretching during film formation) and the thickness in mils. The percent change of each dimension based on the initial film dimensions is then determined. The above procedure is then repeated using a cellophane film available from E. I duPont de Nemours & Co., Inc. under the tradename PUDO-134 TM. The results are summarized at Table IV.

TABLE IV

| Film Sample | Thickness (% change) | Width (% change) | Length (% change) |
| --- | --- | --- | --- |
| Polymer coated microporous film | +9.1 | +.75 | −0.25 |
| PUDO-134 ® | +192 | +4.7 | −2.0 |

NOTE: A positive % change represents swelling and a negative % change represents shrinkage.

The above data clearly shows that films of the subject invention exhibit substantially more dimensional stability than conventional cellophane films.

The principals, preferred embodiment and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A hydrophilic open-celled microporous membrane which comprises a normally hydrophobic microporous membrane, having deposited on at least one surface thereof a coating comprising a polymer selected from the group consisting of cellulose esters, and polyvinyl alcohol, said coating having a dry thickness of from about 1 to about 25 microns, and a surfactant disposed within said coated microporous membrane in a manner and in at least an amount sufficient to render the substrate microporous membrane hydrophilic.

2. The coated microporous membrane of claim 1 wherein the cellulose ester is cellulose acetate.

3. The coated microporous membrane of claim 1 wherein said coating initially additionally comprises a surfactant.

4. The coated microporous membrane of claim 1 wherein said substrate membrane has from about 8 to about 40%, by weight, based on the weight of said substrate membrane of surfactant impregnated in the pores thereof.

5. The coated microporous membrane of claim 1 wherein said surfactant is initially present in said coating in an amount of from about 20 to about 200%, by weight, based on the weight of said polymer coating.

6. The coated microporous membrane of claim 1 wherein the surfactant is selected from the group consisting of silicon glycol copolymers; mixtures of silicon glycol copolymers and at least one imidazoline tertiary amine; ethoxylated 2-ethyl-hexyl phosphate; vinyl acetate; acrylic acid; and methacrylic acid.

7. The coated microporous membrane of claim 1 wherein the membrane is an open-celled microporous film, derived from an olefinic polymer by the "dry stretch" or "solvent stretch" methods, having an average pore size of from about 200 to about 10,000 A, a porosity of from about 30 to about 85%, and a surface area of at least 10 sq.m/gm; and said coating has a dry thickness of from about 1 to about 10 microns.

8. The coated microporous membrane of claim 1 wherein the membrane upon which said coating is deposited further comprises a layer of non-woven substantially continuous randomly arranged filamentary material derived from polymers selected from the group consisting of polyolefins, cellulose acetate, polyamides, polyacetals, polyalkylene sulfides, and polyarylene oxides, said layer of filamentary material being embossed on the surface of said membrane to achieve a thickness of from about 1 to about 10 mils, and being coextensive with the surface of the microporous membrane on which it is present.

9. The coated microporous membrane of claim 8 wherein the filamentary material is derived from a polyolefin, said filamentary layer is applied to only one surface of the microporous membrane and said coating is present on the surface of said filamentary layer.

10. The coated microporous membrane of claim 8 wherein the filamentary material is polypropylene having a denier per filament of from about 0.5 to about 5 and the dry thickness of the filamentary layer is about 1 to about 5 mils.

11. A battery separator which comprises at least one of the coated microporous membranes of any one of claims 1 through 10.

12. In a battery comprising at least one electrolytic cell, said cell including an anode and a cathode disposed in an alkaline electrolyte, said anode and cathode being separated in said electrolyte by a battery separator the improvement comprising the battery separator comprising at least one coated microporous membrane of any one of claims 1 to 10.

13. The battery of claim 12 which is rechargeable and contains a zinc anode.

* * * * *